United States Patent [19]

McCord

[11] 4,264,144
[45] Apr. 28, 1981

[54] REARVIEW MIRROR

[76] Inventor: Robert C. McCord, 6220 Burton, Romulus, Mich. 48174

[21] Appl. No.: 916,598

[22] Filed: Jun. 19, 1978

[51] Int. Cl.³ .............................................. G02B 5/10
[52] U.S. Cl. .................................... 350/293; 350/303
[58] Field of Search ................................ 350/303, 293

[56] References Cited

U.S. PATENT DOCUMENTS

| 1,784,710 | 12/1930 | Showalter | 350/293 |
| 3,003,396 | 10/1961 | Jenkins | 350/293 |
| 4,012,125 | 3/1977 | Hart | 350/303 |

FOREIGN PATENT DOCUMENTS

| 1941895 | 3/1971 | Fed. Rep. of Germany | 350/303 |
| 1947956 | 4/1971 | Fed. Rep. of Germany | 350/303 |
| 2054396 | 5/1972 | Fed. Rep. of Germany | 350/303 |

Primary Examiner—Jon W. Henry
Attorney, Agent, or Firm—Charles W. Chandler

[57] ABSTRACT

A rearview mirror for passenger vehicles has a primary viewing surface that is substantially flat. This surface curves to the rear of the mirror, with a continuously decreasing radius of curvature, toward at least one lateral edge thereof. This provides peripheral vision to the operator of a vehicle in addition to this vision directly to the rear. The peripheral vision introduces a very gradually increasing rate of distortion as the reflected image approaches the edge of vision. This causes the peripherally reflected images to be easily relatable to those reflected from the primary viewing surface.

7 Claims, 10 Drawing Figures

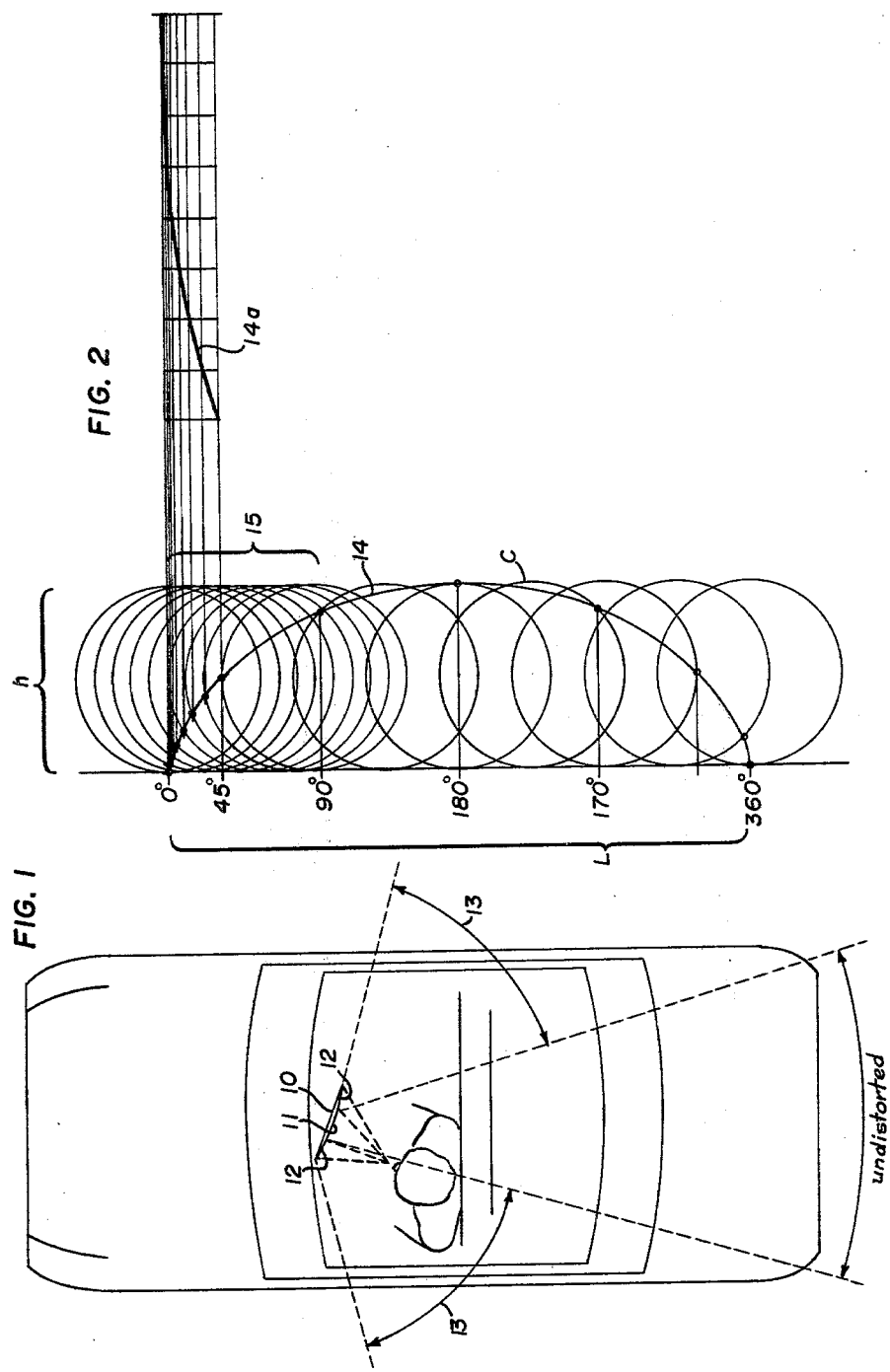

REARVIEW MIRROR

BACKGROUND OF THE INVENTION

This invention relates broadly to rearview mirrors for automotive vehicles. More specifically, it relates to such mirrors that are constructed so that they eliminate peripheral blind spots, yet avoid discontinuities and sudden distortions in reflected images.

Rearview mirrors for automotive vehicles have been notoriously inadequate in enabling a driver to determine the traffic situation in rearward, peripheral positions relative to his vehicle. They provide a kind of tunnel vision directly to the rear, leaving blind spots that lead many drivers into the dangerous practice of turning their heads to look to the rear while driving their vehicles forward. Although quite a number of mirror devices have been developed in efforts to solve this problem, it is still considered to be one of the primary safety hazards associated with automotive vehicles.

Perhaps the most common of the devices that attempt to solve this problem of rearward, peripheral blind spots is the spherical-surface mirror. Although such mirrors do eliminate blind spots, they introduce spherical distortions and greatly reduced image sizes; so that both the distance and direction of other vehicles reflected thereby are difficult to determine. This effect is especially acute at night, when only the headlights of rearward vehicles can be seen. Attempts to alleviate spherical distortion and image reduction by using over-sized, spherical mirrors introduce their own disadvantages, such as blocking out excessive areas of the driver's forward vision.

Spherical and planar mirror combinations (e.g., U.S. Pat. Nos. 2,605,676; 2,911,177; and 3,389,952) have also been somewhat unsuccessful, because it is too difficult for the average driver to correlate the images of the two mirrors in the split-second glance he is allowed by ordinary traffic situations.

Similar difficulties have been introduced by mirrors composed of a series of plane mirror segments arranged to form a convex curve (e.g., U.S. Pat. No. 3,972,601). Although there are no image reductions in such a mirror, an image of a moving object appears to jump through space, as it passes from one mirror segment to another. This makes the object difficult to locate and creates an effect of confusion and psychological stress on the driver. The severity of this effect, together with possible hiatuses between the mirror segments is variable according to the distance of the mirror from the driver's eyes.

Rearview periscopes have been tried and were found to provide little more than would a very large planar mirror, while, at the same time, introducing structural difficulties.

U.S. Pat. No. 2,778,273 to Fellmeth shows circular mirrors, each having a circular, flat portion surrounded by a spherical or conical mirror surface. U.S. Pat. No. 3,764,201 to Haile shows a rectangular, flat mirror having three edge portions that conform to circular, cylindrical surfaces. U.S. Pat. No. 2,857,810 to Troendle shows a rectangular mirror, the two lateral edge portions of which curve rearwardly in conformity with circular cylinders or cones.

The mirrors of these three patents all have flat surfaces that abruptly conform to cylindrical, conical, or other surfaces based on arcs of circles. Hence, a moving image, as of an automobile approaching from the rear, changes from an undistorted image to one that suddenly appears farther away and rather drastically distorted. Hence, it is difficult for the driver to relate images reflected from the flat surface, in space, with those reflected from the adjoining, curved surfaces.

SUMMARY OF THE INVENTION

An object of the present invention, therefore, is to solve this problem of the prior art by providing a rearview mirror that eliminates blind spots when used with automotive vehicles. Another object is to provide such a mirror having a large viewing area, relatively free of distortion, that blends so gradually into a mirror area of increasing curvature that the increasing image distortion is readily relatable to images reflected from the primary viewing surface.

An important feature of the invention is its simplicity and ease of manufacture. It is essentially a rearview mirror of conventional size wherein the primary viewing surface is either flat or the area of least curvature of a curve that has a continuously decreasing radius of curvature toward at least a lateral edge of the mirror; so that the edge curves rearwardly.

Other objects and advantages of the invention will be noted as the following, detailed description is read with reference to the accompanying drawings. Each part number refers to the same part throughout the disclosure.

BRIEF DESCRIPTION OF THE DRAWINGS

In the drawings:

FIG. 1 is a diagram showing the practical extent of the panoramic view provided a driver of a typical automotive vehicle by the invention;

FIG. 2 is a diagram showing the type of curve on which the invention is based;

DESCRIPTION OF THE PREFERRED EMBODIMENTS

Figure 7:
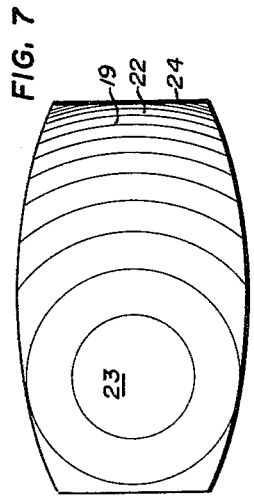
FIGS. 7 and 8 are similar to FIGS. 5 and 6, but show a mirror that is asymmetrical about the primary viewing surface.

The mirror 10, as shown in FIG. 1, provides a primary viewing surface 11 that produces little or no image reduction or distortion, flanked by two areas 12 that are curved toward the rear of the mirror 10. The curved areas 12 of the mirror 10 are integrally connected to the relatively flat, primary viewing surface 11 to provide peripheral vision in the directions labeled 13.

The essential characteristic of each curved area 12 is that it fairs into the surface of the primary viewing area 11, and is integral therewith, but curves rearwardly with a continuously decreasing radius of curvature. A number of common, mathematical curves, e.g. the trigonometric tangent, the ellipse, the logarithmic curve, as well as the cycloidal curve, have portions that are relatively flat, extending into portions that have continuously decreasing radii of curvature, so that they could be used for the present invention. This includes empirical curves.

In a preferred embodiment of the invention, a modified, cycloidal curve 14a (FIG. 2) is used as the basic curve for the area 12. The cycloidal curve is defined as the path of a point on the circumference of a rolling circle. Hence, there is a constant relationship between the height h of a cycloidal curve and the length l of the major axis thereof—the height h being equal to the diameter of the rolling circle c. The major axis l is equal to the circumference of the same circle, or to its height h multiplied by $\pi$.

To make the cycloidal curve more useful, the major axis is modified in some proportionate way relative to the height of the curve: The major axis may be lengthened by multiplying it by some constant factor; It may be drawn on a logarithmic scale, which will increase the rate of curvature at the end portions of the curve; etc. One method of modifying the cycloidal curve for this purpose is shown in FIG. 2. In this diagram, the first quarter 15 of a cycloidal curve 14 is projected at right angles to create a new curve 14a wherein the rates of curvature are reversed.

Figure 3:
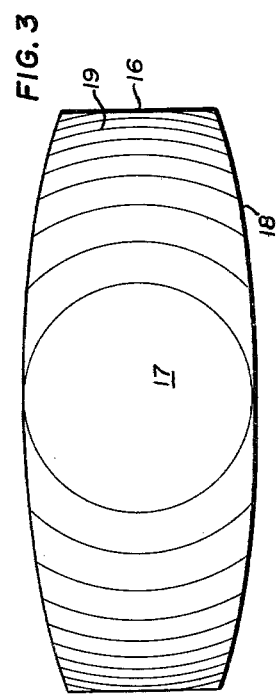
FIGS. 3 and 4 are front and top views, respectively, of a mirror wherein the primary viewing surface is flat and the surrounding area conforms to a surface tangential therewith that is based on a cycloidal curve.
Figure 4:

FIGS. 3 and 4 show a rearview mirror 16 wherein the primary viewing surface 17 is flat, surrounded by a peripheral area of revolution 18, about the center thereof, formed according to the curve 14a, illustrated in FIG. 2. The contour lines 19 are included to show the rates of curvature on the mirror 16. The peripheral area 18 may also be formed by the surface of an elliptical torus, wherein the major axis of the ellipse lies in the plane of the torus.

Figure 5:
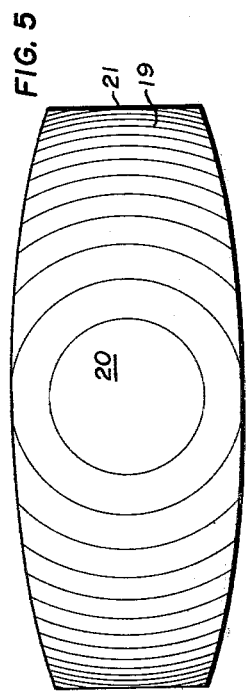
FIGS. 5 and 6 are similar to FIGS. 3 and 4, but show a mirror entirely conforming to a modified, cycloidal curve of revolution about the point of least curvature.
Figure 6:

FIGS. 5 and 6 show a second embodiment of the invention, wherein the entire surface 20 of the mirror 21 conforms to a surface of revolution generated by rotating a curve similar to that shown in FIG. 3 about an axis extending perpendicular to the point of least curvature.

Figure 8:
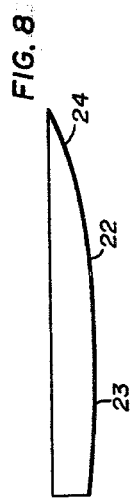

FIGS. 7 and 8 show a third embodiment of the invention that is similar to that of FIGS. 5 and 6, except that the curved portion 22 is laterally nonsymmetrical relative to the primary viewing area 23. This embodiment is especially useful when the mirror 24 is to be mounted to the side of a driver's vision, in which case, the larger, curved portion of the mirror is to be oriented toward him.

Figure 9:
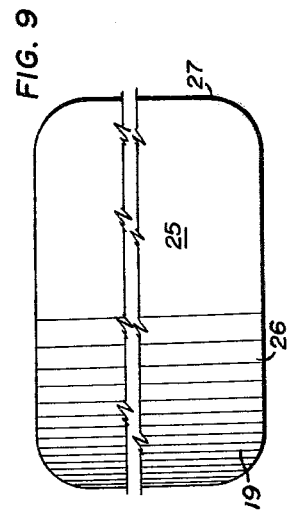
FIGS. 9 and 10 show a mirror in which the primary viewing area is flat and curves toward one edge thereof in conformity to a modified, cycloidal curve.
Figure 10:
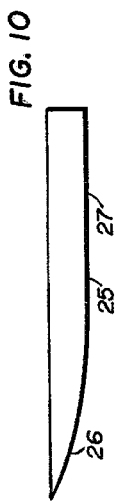

FIGS. 9 and 10 show a fourth embodiment of the invention wherein the primary viewing surface 25 is flat, and the curved portion 26, conforming to the curve 14a of FIG. 2 is on one side only. This type of mirror 27 is appropriate for external mounting on the side of a vehicle, as is commonly done with mirrors for trucks.

The mirrors of the invention are manufactured according to standard techniques for making curved mirrors.

An invention has been described that provides an advance in the art of rearview mirrors. Although the embodiments have been described specifically with regard to detail, it should be noted that many details may be altered without departing from the scope of the invention, as it is defined in the following claims. The invention is useful with all types of passenger vehicles, including boats, bicycles, motorcycles, etc.

I claim:

1. A mirror having a substantially flat, primary viewing surface, said primary viewing surface having a border merging substantially tangentially into an edge viewing portion which curves away from said primary viewing surface, said edge viewing portion having a cycloidal curvature having a continuously decreasing radius of curvature from the border of said primary viewing surface to the outer edge of said edge viewing portion.

2. A mirror as defined in claim 1, in which said edge viewing portion forms a segment of a surface of revolution developed by revolving said cycloidal curvature about an axis substantially normal to said primary viewing surface.

3. A mirror having a substantially flat, primary viewing surface, said primary viewing surface having a border merging substantially tangentially into an edge viewing portion which curves away from said primary viewing surface, said edge viewing portion having a curvature developed by projecting at right angles to a major axis successive positions, equally spaced angularly, of a point on the circumference of a circle rolling along said major axis, and tracing the curve defined by intersections of successive projection lines of the point perpendicular to said major axis with successive equally spaced lines parallel to said major axis.

4. The mirror of claim 3 wherein the curved portion thereof is defined by projections, throughout a maximum angular displacement of about 90°, of the point positions on the circumference of the rolling circle, beginning with the position of the point on the major axis.

5. A mirror having a substantially flat primary viewing surface, said primary viewing surface having a border merging substantially tangentially into an edge viewing portion which curves away from said primary viewing surface, said edge viewing portion having a curvature conforming to a portion of an ellipse and having a continuously decreasing radius of curvature from the border of said primary viewing surface to the outer edge of said edge viewing portion.

6. A mirror as defined in claim 3, in either which the primary viewing surface has a linear border and the edge viewing portion curves away from said linear border.

7. A mirror as defined in either claim 3 or 5, in which the primary viewing surface has a circular border, and the edge viewing portion forms a segment of a surface of revolution developed by revolving the curvature of the edge viewing portion about an axis normal to said primary viewing surface.

* * * * *